E. P. H. Capron,
Turbine Water Wheel.

No. 113,853.          Patented Apr. 18, 1871.

Witnesses.
John S. Thornton
Wm. Pentz

Inventor:
Elisha P. H. Capron

United States Patent Office.

ELISHA P. H. CAPRON, OF HUDSON, NEW YORK.

Letters Patent No. 113,853, dated April 18, 1871.

---

IMPROVEMENT IN WATER-WHEELS AND CHUTES.

---

The Schedule referred to in these Letters Patent and making part of the same.

---

*To all whom it may concern:*

Be it known that I, ELISHA P. H. CAPRON, of the city of Hudson, in the county of Columbia and State of New York, have invented new and useful Improvements in Turbine Water-Wheels; and I do hereby declare that the following is a full and exact description thereof, reference being had to the accompanying drawing forming a part of this specification and to the letters of reference marked thereon.

My invention relates to that class of hydraulics known as the in-flow turbine water-wheel, and more especially to a certain portion of the mouth or inlet to the scroll and the buckets.

Its objects are to provide a cheap and easy method for constructing and introducing the buckets into the wheel and securing them in their proper position, and detaching or removing them when required to do so for repairs or otherwise; also to construct the mouth of the scroll in such a manner that a portion of the same may be readily removed, so that easy access may be had to the gate; also, to construct the gate so that it may be adjusted to compensate for any wear, so as to prevent leakage and other inconveniences.

Its further object is to continue the propelling action of the water after it leaves the buckets.

The nature of my improvements consists, first, in making the buckets separate and movable, so that they may be polished for the purpose of lessening or decreasing friction, and removed without taking the wheel apart; and providing a flange or bead of any desired form upon each of the buckets, which may be made in sections or continuous the whole length of the edge of the bucket, which said flange is made to closely fit into a corresponding groove made in the disks of the wheel, and is then secured by means of a screw-bolt passing through the said disks into the flange or edge of the bucket.

It consists, secondly, in making the upper portion of the mouth or inlet to the scroll near the gate in such a manner that it may be readily removed, so that ready access may be had to the gate when the same needs repairs, or when any obstruction occurs which needs to be removed, and so that the gate itself may be removed and replaced without the necessity of disconnecting the wheel from the flume.

It consists, thirdly, in providing adjustable strips or bars on the inside of the gate for the purpose of compensating for wear and to prevent leakage; and It further consists in the combination of the wheel, when the same is provided with a shaft but is without a hub, with hollow flanges, each in the form of a half dome, located on the inner periphery of each disk, which said flanges correspond in number to the number of buckets, and their bases receive the water as it leaves the buckets, for the purpose of continuing the propelling action of the water upon the wheel.

The advantages of my improvements over the old method of making the in-flow turbine-wheel are obvious: the old method being to cast the buckets solid in the wheel, the sections being cast to the disk of the wheel, which rendered it impossible for the buckets to be finished or polished in the least, but required the wheel to be put up as it left the sand. Again, if a bucket became accidentally broken the whole wheel or one section of the same was necessarily rendered useless and must be replaced, which, at a distance from a manufactory, caused long delays and large expense for repairs, while, if the purchaser has my improvements he may be furnished with extra buckets, so that when one fails a new one can be inserted without the aid of a mechanic and with comparatively no delay. Another advantage is, that the gate may be removed and another put in its place without disconnecting the wheel or scroll from the flume, and also that the gate may be adjusted and made to fit closely when the edges have become worn.

To enable others skilled in the art to make and use my invention, I will proceed more particularly to describe the same.

Letters of like name and kind indicate like parts in each of the figures.

A represents the case in which my improvements are inclosed, which is made in the ordinary manner, except the mouth or inlet to the scroll, which will be hereinafter more fully described.

The wheel is made without a hub, and secured to the shaft F in the ordinary manner.

On the inner peripheries of the upper and lower disks, at the discharge, I provide hollow flanges K, made in the form of a half dome, which said flanges correspond in number to the number of buckets. The base of these flanges receives the water as it leaves the buckets, which thus continues its propelling power after it so leaves the buckets, and the wheel being without a hub a free discharge is insured, and economy in power is secured by the continued action of the water just mentioned.

B is the conduit or throat which conducts the water to the wheel, for which, just above the gate, I provide a cap or movable piece, C, for the purpose of enabling me to have ready and easy access to the gate and throat, either to repair the gate or remove obstructions in the throat, and so as not to be compelled to disconnect the scroll from the flume or remove the wheel from the case when obstructions occur or a new gate is to be fitted in, in place of the one removed.

Figure 1:
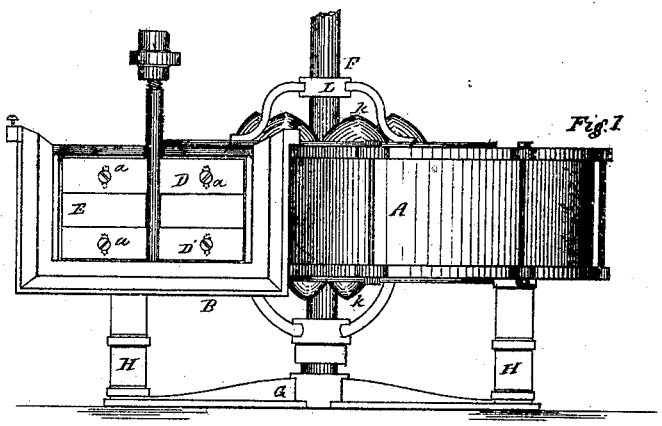
Figure 1 shows a side elevation of the gate and case inclosing my improvements, also the bridge and bridge-tree which supports the wheel.
Figure 2:
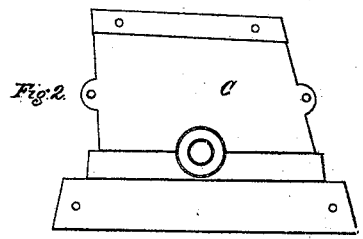
Figure 2 represents a detached view of the movable cover to the mouth or inlet of the scroll.

D D' are strips or bars, made adjustable, and secured to the inner side of the body of the gate E by means of screw-bolts $a$ passing through elongated slots, to compensate for the wear that naturally occurs in long working the gate, so as to prevent leakage. In fig. 1 the inner side of the gate is turned outward and the slots are shown in dotted lines.

F represents the shaft to which my improvements are secured;

G shows the bridge-tree that supports the weight of the wheel; and

H H are columns that support the curb or casing A.

Figure 3:
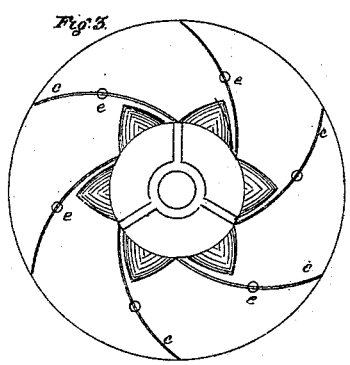
Figure 3 represents the upper disk of the wheel, showing the grooves in which the buckets are secured.

In fig. 3 are shown the grooves C C C, into which the flanges or beads on the buckets are made to fit; on each bucket the flange may be made in sections or continuous upon each of the buckets, or ledges may be cast upon the disk to hold the bucket, as raised ledges may be made and used for securing the bucket in position without materially affecting the objects of my invention.

$e\ e\ e$ are the bolt-holes into which the bolts enter, after passing through the disk, for the purpose of preventing the buckets from working in a longitudinal direction.

Figure 4:
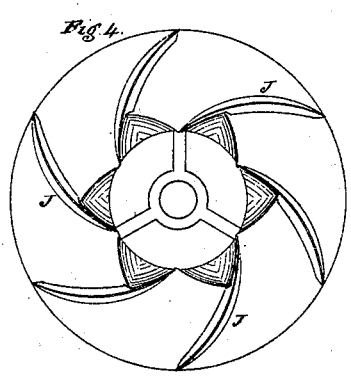
Figure 4 shows the lower disk with the buckets in position.

J J J are the buckets. In fig. 4 these are shown in position, their edges, however, only being shown.

L represents the spider that supports the shaft F above the curb or case.

Figure 5:
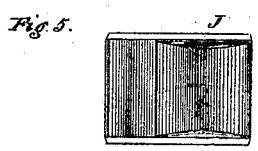
Figure 5 is a side elevation of the inside of the bucket.
Figure 6:
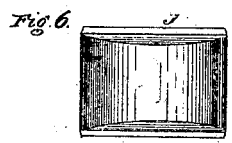
Figure 6 is a side elevation of the outside of the bucket.

In figs. 5 and 6 are shown side elevations of the buckets with flanges or beads made in V-form, so as to fit into the grooves in the disks.

On the upper and lower edges of the back of these buckets are fillets, for the purpose of avoiding friction incident to sharp angles, and on the inner end of the inside of the bucket is a slight recess for the purpose of allowing the water to expand or spread as it leaves the inner end of the adjoining bucket.

Having thus described my invention,

What I claim as new, and desire to secure by Letters Patent of the United States, is—

1. The buckets of a turbine-wheel, made separate and movable, when the said wheel is moved without a hub, so as to be readily put in position or removed as may be desired, substantially as and for the purposes set forth.

2. The adjustable strips or bars D D, in combination with the main portion of the gate and throat, as shown and described, and for the purposes set forth.

3. The movable cap C, in combination with the gate E and throat B, substantially as shown and described, and for the purposes set forth.

4. The flanges K, in combination with a turbine-wheel made without a hub, and the buckets J, substantially as herein shown and described, and for the purposes set forth.

ELISHA P. H. CAPRON.

Witnesses:
JOHN S. THORNTON,
WM. VENTS.